United States Patent
Cesares Cano et al.

(10) Patent No.: US 10,244,519 B2
(45) Date of Patent: Mar. 26, 2019

(54) INTRA-SUBFRAME DYNAMIC RECEPTION DIVERSITY

(71) Applicant: Intel IP Corporation, Santa Clara, CA (US)

(72) Inventors: Jose A. Cesares Cano, Dresden (DE); Mathias Kurth, Dresden (DE); Giuseppe Patane, Linz (AT)

(73) Assignee: Intel IP Corporation, Santa Clara, CA (US)

( * ) Notice: Subject to any disclaimer, the term of this patent is extended or adjusted under 35 U.S.C. 154(b) by 421 days.

(21) Appl. No.: 14/977,010

(22) Filed: Dec. 21, 2015

(65) Prior Publication Data

US 2017/0181133 A1 Jun. 22, 2017

(51) Int. Cl.
*H04W 72/04* (2009.01)
*H04B 17/336* (2015.01)
(Continued)

(52) U.S. Cl.
CPC ........ *H04W 72/042* (2013.01); *H04B 7/0452* (2013.01); *H04B 7/0871* (2013.01);
(Continued)

(58) Field of Classification Search
CPC ........... H04W 72/042; H04W 72/0446; H04W 24/02; H04W 52/0229; H04W 52/0245;
(Continued)

(56) References Cited

U.S. PATENT DOCUMENTS

2009/0247091 A1* 10/2009 Jalloul ................. H04W 48/18
455/70
2013/0039401 A1* 2/2013 Han ..................... H04B 7/0617
375/222

(Continued)

OTHER PUBLICATIONS

"European Application Serial No. 16198441.4, Extended European Search Report dated Apr. 11, 2017", 13 pgs.

(Continued)

*Primary Examiner* — Chi Tang P Cheng
(74) *Attorney, Agent, or Firm* — Schwegman Lundberg & Woessner, P.A.

(57) ABSTRACT

An apparatus of user equipment (UE), comprises physical layer (PHY) circuitry, wherein the PHY circuitry includes a radio frequency (RF) transceiver comprising: a first receive path configured to receive RF signals from an enhanced node B (eNB) of a cellular network and down convert the received RF signals using a local oscillator (LO) receive frequency; and a second receive path configured to down-convert received RF signals from the eNB and to operate simultaneously with the first communication path; and processing circuitry configured to: determine that a configured transmission mode of the UE supports receiving data using a single receive channel and includes receive antenna diversity; determine channel conditions using at least one channel quality metric; and; disable one of the first and second receive paths during a portion of a subframe transmitted during a downlink (DL) communication according to the determined transmission mode and the determined channel conditions.

22 Claims, 6 Drawing Sheets

(51) Int. Cl.
*H04B 7/0452* (2017.01)
*H04W 24/02* (2009.01)
*H04B 7/08* (2006.01)
*H04W 52/02* (2009.01)

(52) U.S. Cl.
CPC .......... *H04B 17/336* (2015.01); *H04W 24/02* (2013.01); *H04W 52/0229* (2013.01); *H04W 52/0245* (2013.01); *H04W 72/0446* (2013.01); *Y02D 70/00* (2018.01); *Y02D 70/1222* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/21* (2018.01); *Y02D 70/23* (2018.01); *Y02D 70/444* (2018.01)

(58) Field of Classification Search
CPC .. H04B 17/336; H04B 6/0452; H04B 6/0871; Y02D 70/1222
USPC .......................................................... 370/329
See application file for complete search history.

(56) References Cited

U.S. PATENT DOCUMENTS

| | | | |
|---|---|---|---|
| 2013/0242772 | A1* | 9/2013 | Attar .................. H04B 7/0871 370/252 |
| 2014/0140424 | A1 | 5/2014 | Clevorn |
| 2014/0269994 | A1* | 9/2014 | HomChaudhuri .......................... H04W 52/0209 375/316 |
| 2016/0218789 | A1* | 7/2016 | Park ..................... H04B 7/0632 |

OTHER PUBLICATIONS

Sony, "Active RX Time tor NC-PDCCH and ePDCCH tor MTC", 3GPP Draft; R1-150426, 3rd Generation Partnershipproject (3GPP), Mobile Competence Centre ; 650, Route Des Lucioles ; F-06921 Sophia-Antipolis Cedex; France vol. RAN WG1, No. Athens, Greece; 20150209-201502138, XP050933634, [Online] retrieved from the internet: :http://www.3gpp.org/ftp/Meetings_3GPP_SYNC/RAN1/Docs/, (Feb. 8, 2015), 7 pgs.
"European Application Serial No. 16198441.4, Response Filed Dec. 4, 2017 to Extended European Search Report dated Apr. 11, 2017", 17 pgs.

* cited by examiner

INTRA-SUBFRAME DYNAMIC RECEPTION DIVERSITY

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and 3GPP LTE-Advanced Pro networks, although the scope of the embodiments is not limited in this respect. Some embodiments pertain to transmitting and receiving data using radio access networks. Some embodiments relate to reducing power consumption of mobile telephone communication equipment.

BACKGROUND

Radio access networks are used for delivering voice communications to mobile user equipment such as a cellular telephone or a smart phone. The battery lifetime of mobile devices is an issue for performance and user satisfaction. Thus, there are general needs for devices, systems and methods that provide robust communication channel and either improve power consumption or do not negatively impact power consumption.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
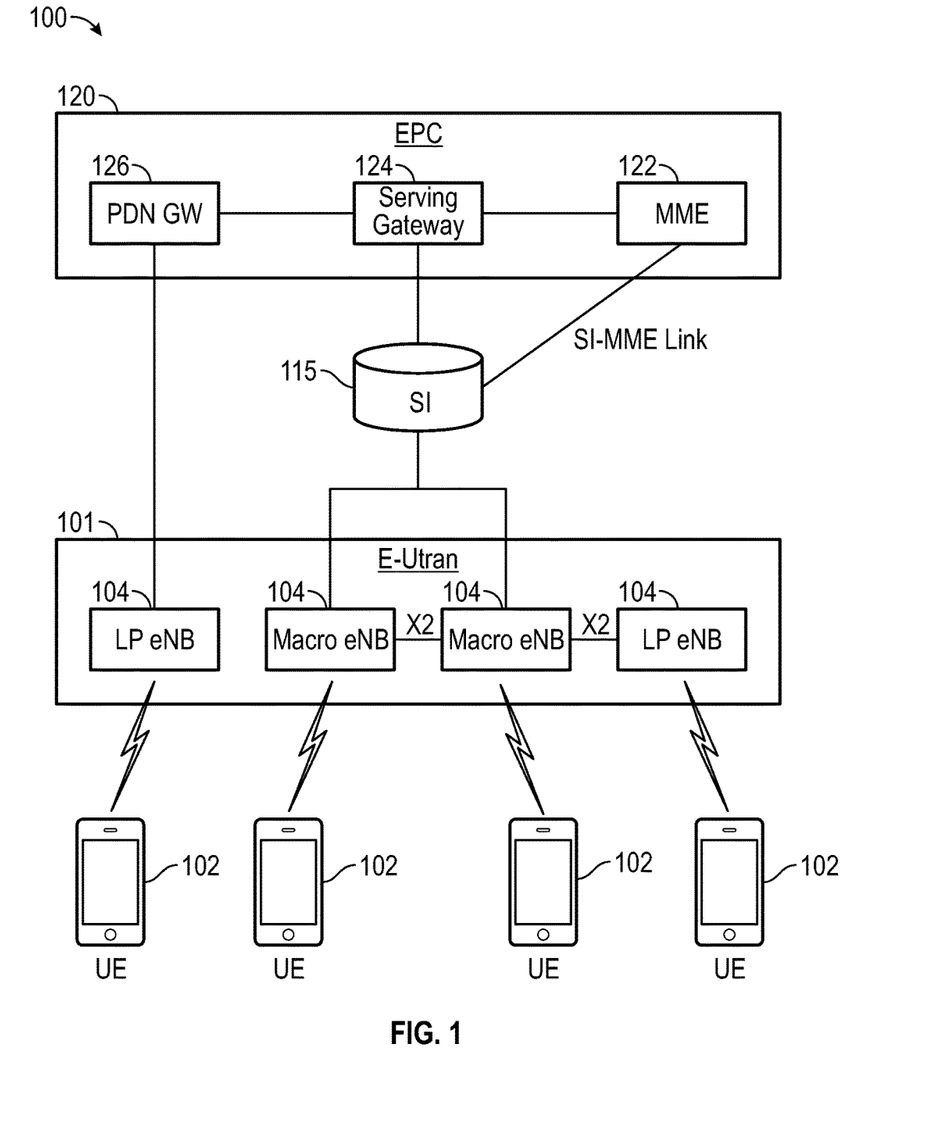
FIG. 1 illustrates an example of a portion of an end-to-end network architecture of an LTE network with various components of the network in accordance with some embodiments.

FIG. 1 shows an example of a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity, only a portion of the core network 120, as well as the RAN 100, is shown in the example. The core network 120 includes mobility management entity (MME) 122, serving gateway (serving GW) 124, and packet data network gateway (PDN GW) 126. The RAN includes enhanced node B's (eNBs) 104 for communicating with user equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. Two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of downlink control information (DCI) and the channel condition. There may be four or more different PDCCH formats defined in LTE with different numbers of CCEs (e.g., aggregation level, L=1, 2, 4, or 8).

Figure 2:
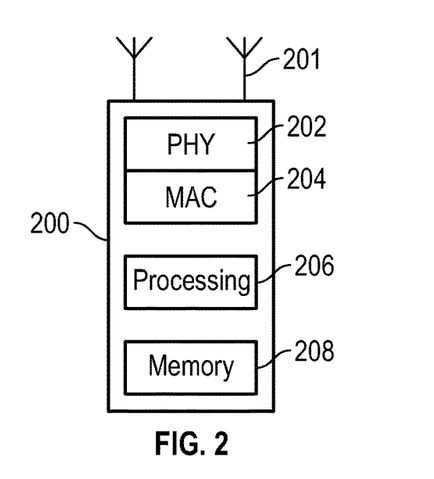
FIG. 2 shows a functional block diagram of an example of user equipment in accordance with some embodiments.

FIG. 2 illustrates a functional block diagram of a UE in accordance with some embodiments. The UE 200 may be suitable for use as any one or more of the UEs 102 illustrated in FIG. 1. The UE 200 may include physical layer (PHY) circuitry 202 for transmitting and receiving radio frequency electrical signals to and from one or more nodes of a radio access network such as eNBs 104 (FIG. 1) using one or more antennas 201. The PHY circuitry 202 may include circuitry for modulation/demodulation, upconversion/downconversion, filtering, amplification, etc. UE 200 may also include medium access control layer (MAC) circuitry 204 for controlling access to the wireless medium and to configure frames or packets for communicating over the wireless medium. UE 200 may also include processing circuitry 206 and memory 208 arranged to configure the various elements of the UE to perform the operations described herein. The memory 208 may be used to store information for configuring the processing circuitry 206 to perform the operations.

In some embodiments, the UE 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an internet of things (IoT) device (e.g., a smart sensor), or other device that may receive and/or transmit information wirelessly. In some embodiments, the UE 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the UE 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 200 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network or a high speed downlink/uplink access (HSDPA/HSUPA) communication network or a universal mobile telecommunications system (UMTS) network or a global system for mobile communications (GSM) network, although the scope of the invention is not limited in this respect.

As explained previously, it is desirable to improve power consumption of mobile devices such as mobile UEs. Mobile devices can include multiple receive paths. A receive path refers to the processing chain from the antenna to the baseband (BB) circuitry, and can include the antenna and at least a portion of the BB circuitry.

Figure 3:
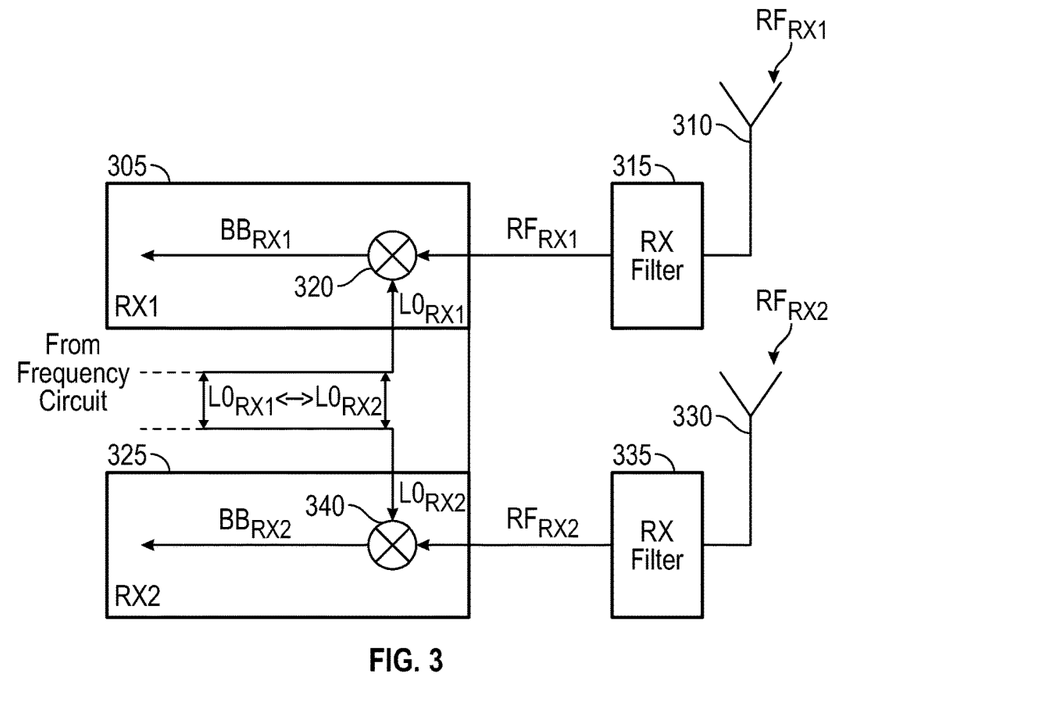
FIG. 3 is a circuit block diagram showing portions of an example of a diversity receiver configuration for radio frequency (RF) communication circuitry in accordance with some embodiments.

FIG. 3 is a circuit block diagram showing portions of an example of a diversity receiver configuration of UE in accordance with some embodiments. The configuration includes a first receive (RX) path 305 (RX1) that includes at least one antenna 310, filter circuit 315, and mixer circuit 320. The first receive path 305 down-converts a desired received RF signal by mixing the received signal with a first local oscillator (LO) signal $LO_{RX1}$ of a first receive frequency $f_{LORX1}$ using the mixer circuit 320. The RF signal may be received from an eNB. The configuration also includes a second receive path 325 (RX2) that includes at least one antenna 330, filter circuit 335, and mixer circuit 340. The second receive path 325 down-converts a desired received RF signal by mixing the received signal with the first LO signal of the first receive frequency or a second LO signal ($LO_{RX2}$) of a second receive frequency $f_{LORX2}$ using the mixer circuit 340. The second receive path 325 operates simultaneously with the first communication path. The first and second receive paths can be included in the PHY circuitry of a UE.

An approach to reducing power consumption is dynamic reception diversity. In dynamic reception diversity, the UE turns off receive paths that are inactive. However, previous approaches to reception diversity only turn off inactive receive paths at the borders of subframes. This approach can be referred to as inter-subframe dynamic reception diversity. Further reductions in power can be realized by turning off receive paths when they become inactive with in a subframe. This approach can be referred to as intra-subframe dynamic reception diversity.

An E-UTRAN may configure a transmission mode in a UE that allows for spatial multiplexing so that more than one the UE's receive paths are typically required. Nevertheless, these transmission modes may also allow for fallback to a reduced number of receive paths (e.g., via transmit diversity or single port reception). Because the related signaling is conveyed via the PDCCH within the same subframe, the inter-subframe dynamic reception diversity cannot benefit from turning off receive paths intra-subframe without putting compliance with the cellular network at risk.

Figure 4:
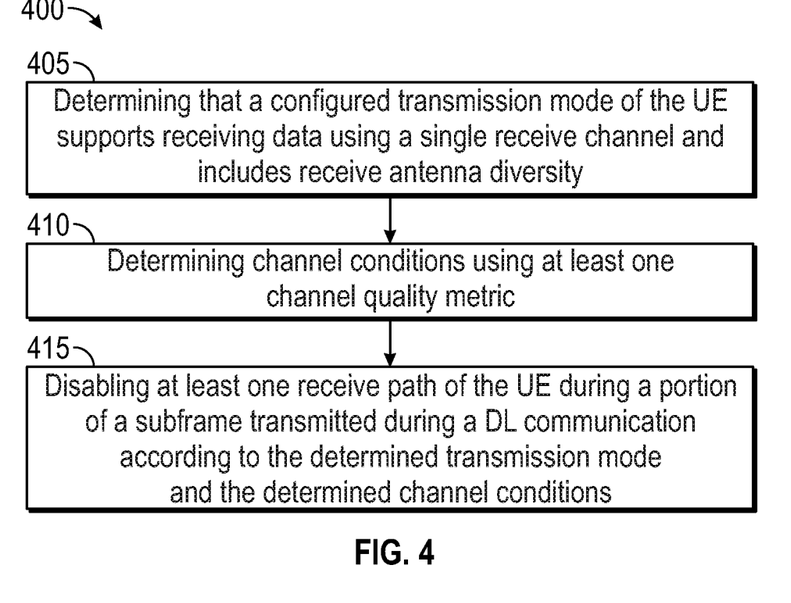
FIG. 4 is a flow diagram of an example of a method of operating user equipment (UE) in accordance with some embodiments.

FIG. 4 is a flow diagram of an example of a method of operating UE according to some embodiments. At 405, the UE determines (e.g., via PDCCH signaling) that a configured transmission mode (TM) of the UE supports receiving data using a single receive channel and includes receive antenna diversity. In some embodiments, the UE determines that the UE supports receiving data using a single receive channel and includes receive antenna diversity when detecting that that the configured TM is a TM of a 3GPP E-UTRAN LTE network that includes receive antenna diversity. In some embodiments, the transmission mode is a transmission mode of a Wi-Fi network (such as a network implemented under one of the Institute of Electrical and Electronic Engineers 802.11 standards, e.g., the IEEE 802.11-2012 standard published Mar. 29, 2012) that includes receive antenna diversity.

At 410, the UE determines channel conditions using at least one channel quality metric. An example of a channel quality metric is signal to interference plus noise ratio (SINR), and the UE may determine channel quality using SINR. If the UE includes two or more receive paths, the TM includes receive antenna diversity, and the measure channel quality satisfies a specified (e.g., programmed) channel quality threshold, the UE may perform intra-subframe dynamic reception diversity.

At 415, the processing circuitry of the UE disables a receive path of the UE during a portion of a subframe transmitted during a downlink (DL) communication according to the determined transmission mode and the determined channel conditions.

Figure 5:
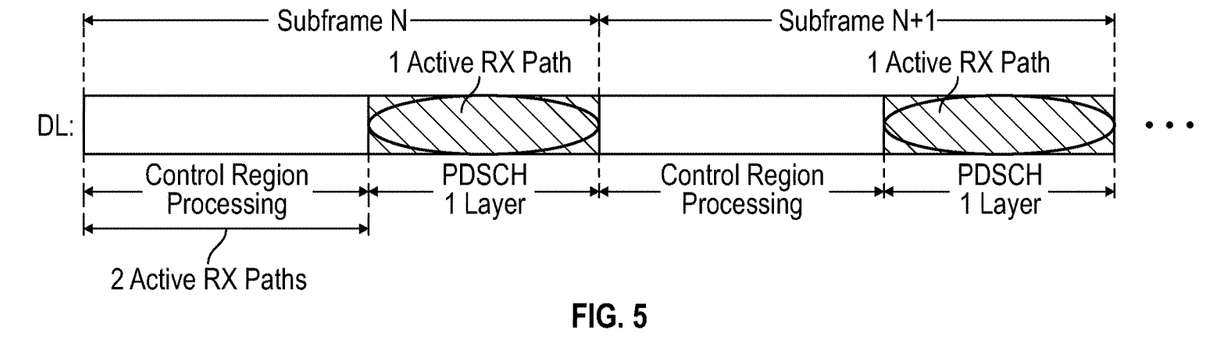
FIG. 5 is a diagram of an example of intra-subframe dynamic reception diversity in accordance with some embodiments.

FIG. 5 is a diagram of an example of intra-subframe dynamic reception diversity according to some embodiments. In the example, it is assumed that TM3 is enabled in the UE. TM3 provides open loop spatial multiplexing with cyclic delay diversity (CDD). Two downlink (DL) subframes (N and N+1) are shown in FIG. 5. Subframe N includes two regions: a region for control processing 505 and a region for downlink of network data 510 (PDSCH). Subframe N+1 follows subframe N and has the same format. Normally, two receive paths are active in the example embodiment. When only one layer is scheduled for the UE, the UE does not receive any DL assignment based on spatial multiplexing. The number of active receive paths can be reduced during region 510. The processing circuitry of a UE may enable the two receive paths during the control region of consecutive subframes of the DL communication, and disable one of the receive paths during the data portion of the consecutive subframes of the DL communication.

Because the receive paths are turned off at the subframe border, the inter-subframe dynamic reception diversity approach is not able to take advantage of this power saving opportunity. Instead, the inter-subframe approach can only allow reduction of the receive paths at the subframe border (e.g., between subframes N and N+1). This is because the UE requires information about the DCI that is carried on the PDCCH and the UE is typically prevented from proactive scheduling used to reduce the number of receive paths within the subframe. Thus, inter-subframe dynamic reception diversity is unable to take advantage of the power savings shown in FIG. 5.

Figure 6:
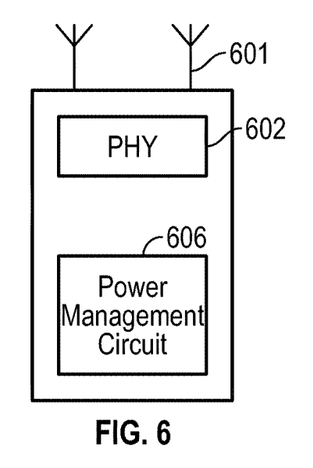
FIG. 6 is a block diagram of an RF communication device in accordance with some embodiments.

FIG. 6 is a block diagram of an RF communication device (e.g., UE). The device 600 includes RF transceiver circuitry 602 and a power management circuitry 606. In some embodiments, the device is included in UE and the power management circuitry 606 is included in the processing circuitry of the UE. The RF transceiver circuitry 602 includes at least two receive paths. The receive paths are electrically coupled to one or more antennas 601 and are used to down-convert RF signals received from an eNB (if the device is included in UE) using a local oscillator (LO) receive frequency. The receive paths operate simultaneously.

The power management circuitry 606 is configured to perform intra-subframe dynamic reception diversity. The power management circuitry 606 determines the configured transmission mode of the device and determines the channel conditions. If the transmission mode supports receiving data using a single receive channel and includes receive antenna diversity, and the channel conditions show that channel quality is high, the power management circuitry may disable one of the first and second receive paths during a portion of a subframe transmitted during a downlink (DL) communication according to the determined transmission mode and the determined channel conditions.

As shown in the example embodiment of FIG. 5, as part of intra-subframe dynamic reception diversity, the power management circuitry 606 enables a receive path of the UE during a first control portion of consecutive subframes of the DL communication, and disables the at least one receive path of the UE during a second data portion of the consecutive subframes of the DL communication. When disabling the receive path, the power management circuitry may disable one or more of a local oscillator circuit, an analog to digital converter circuit, an amplifier circuit, and a physical layer base band for a diversity receive path during transmission of the portion of the subframe of the DL communication.

The power management circuitry 606 may perform intra-subframe dynamic reception diversity when the configured transmission mode is a transmission scheme that includes at least one of i) open loop spatial multiplexing with cyclic delay diversity (CDD), ii) closed loop spatial multiplexing iii) multiple-user multiple-input multiple-output (MIMO) multiplexing, iv) dual-layer transmission capability, or v) eight-layer transmission capability.

In some embodiments, the RF transceiver circuitry 602 is configured to communicate via a Wi-Fi network, and the power management circuitry disables one of the first and second receive paths as part of intra-subframe dynamic reception diversity when the transmission mode is a transmission mode of a Wi-Fi network that includes receive antenna diversity. In some embodiments, the RF transceiver circuitry 602 is configured to communicate via a 3GPP E-UTRAN LTE network, and the power management circuitry 606 disables one of the first and second receive paths as part of intra-subframe dynamic reception diversity when the transmission mode (TM) is one of TM3, TM4, TM5, TM8, or TM9 as defined according to a 3GPP Series 36 specification.

The power management circuitry 606 may only perform intra-subframe dynamic reception diversity when channel quality is high. The high channel quality reduces the possibility of needing retransmissions when the number of receive channels is reduced. The power management circuitry 606 determines the channel condition according to one or more channel quality metrics. In some embodiments, the RF transceiver circuitry 602 measures a signal to interference plus noise ratio (SINR). The power management circuitry 606 determines channel conditions using the measured SINR and a receive path as part of intra-subframe dynamic reception diversity when the measured SINR exceeds a specified threshold SINR value. In some embodiments, the power management circuitry 606 uses the history of quality of the channel is assessing channel quality. In some embodiments, the power management circuitry 606 monitors a channel to generate a history of channel quality of the channel. The power management circuitry 606 disables a receive path according to the history of channel quality. For example, the power management circuitry 606 may disable a receive path as part of intra-subframe dynamic reception diversity when one or more channel quality metric satisfy a channel quality metric for a specified time period, or when the number of retransmissions needed by the channel is less than a threshold number.

As explained above in regard to the example of FIG. 5, the RF communication device may need proactive scheduling in order to reduce the number of receive paths within the subframe. In some embodiments, the device 600 receives information about the DCI that is carried on the PDCCH earlier than in conventional PDCCH decoding modes. This allows the power management circuitry 606 to determine a transmission scheme of the UE using DCI shortly after the start of the PDSCH region within the subframe in time to perform intra-subframe dynamic reception diversity. In certain embodiments, the power management circuitry 606 determines a transmission scheme of the UE shortly after the UE enters radio resource control (RRC) connected mode.

Figure 7A:
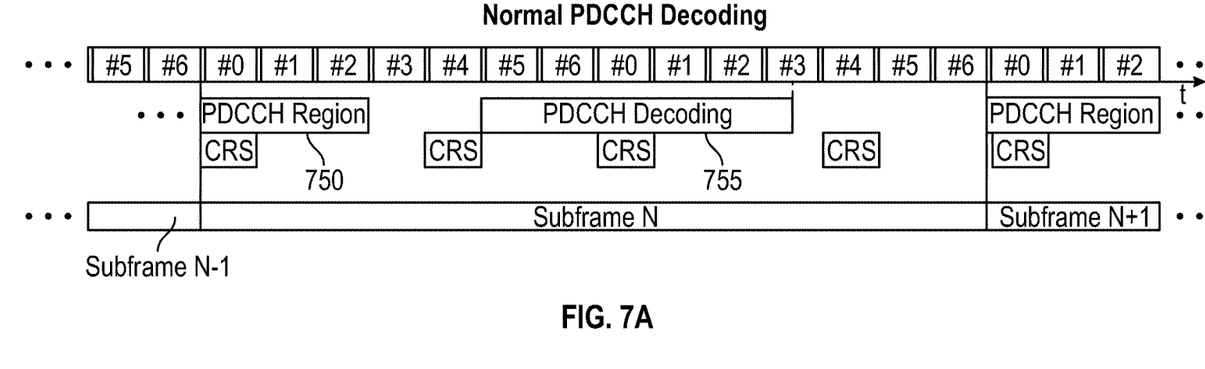
FIGS. 7A and 7B are example embodiments of PDCCH decoding in accordance with some embodiments.
Figure 7B:
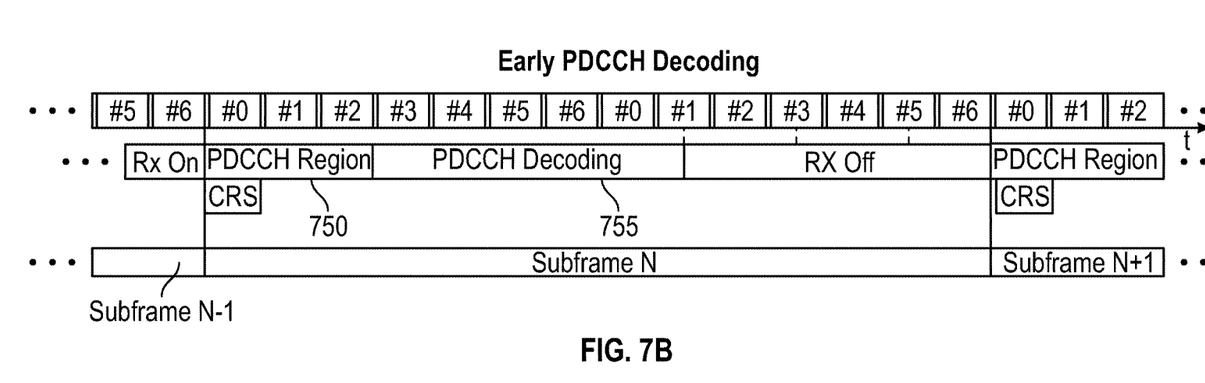

FIGS. 7A and 7B are example embodiments of PDCCH decoding according to some embodiments. The examples show PDCCH decoding for subframes labeled N−1, N, and N+1. In FIG. 7A, multiple cell-specific reference signals (CRS) are used to align times for the PDCCH region 750 and the PDCCH decoding 755 for the UE.

In FIG. 7B, only one CRS, the CRS belonging to the OFDM #0 of the PDCCH region, is used for PDCCH decoding. Using only one CRS may be possible when the conditions of the channel are excellent. As shown in FIG. 7B, using only one CRS allows the PDCCH decoding 755 to occur two symbols earlier. This mode of PDCCH decoding in FIG. 7B allows the power management circuitry 606 to perform PDCCH decoding earlier, and thereby determine the transmission scheme of the UE using downlink control information (DCI) in time to perform inter-subframe dynamic reception diversity.

The UE may need to know which PDCCH encoding/decoding scheme is used by the eNB. In some embodiments, the earlier PDCCH encoding/decoding is used by the eNB when the channel quality is high and signal conditions are excellent. The power management circuitry 606 of FIG. 6 may determine that the PDCCH decoding is available earlier when the RF transceiver circuitry 602 determines that one or more channel quality metrics satisfy a channel quality metric threshold, and disables the at least one receive path of the UE during a portion of a DL subframe according to the determined transmission mode, the PDCCH decoding mode, and the determined channel conditions.

Although the example embodiments provided above refer to a device having two receive paths, the device may have more than two receive paths. In certain embodiments, the RF transceiver circuitry 602 includes N receive paths, where N is an integer greater than two. The power management circuitry is configured to disable any combination of the N receive paths according to the determined transmission mode and the determined channel conditions. The ability to turn off more receive paths results in more energy savings. In some embodiments, the power management circuitry 606 identifies a receive path of the N receive paths with lower channel quality using the at least one channel quality metric, and disables one or more receive paths with lower channel quality during a portion of a DL subframe. In some embodiments, if the configured transmission mode is a transmission scheme that includes multi-user MIMO multiplexing, the power management circuitry 606 may disable one or more receive paths when one only one user is scheduled for the receive paths.

In some embodiments, the power management circuitry 606 enables intra-subframe dynamic reception diversity according to message size. For example, the power management circuitry may enable performing intra-subframe dynamic reception diversity when the number of data packets is less than a specified threshold number of packets. In certain embodiments, intra-subframe dynamic reception diversity may be enabled for voice over LTE (VoLTE) when the data packet size is small. In certain embodiments, intra-subframe dynamic reception diversity may be enabled for machine type communication (MTC) such as for cellular communication for an internet of things (IoT) based on category 3+ UEs.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
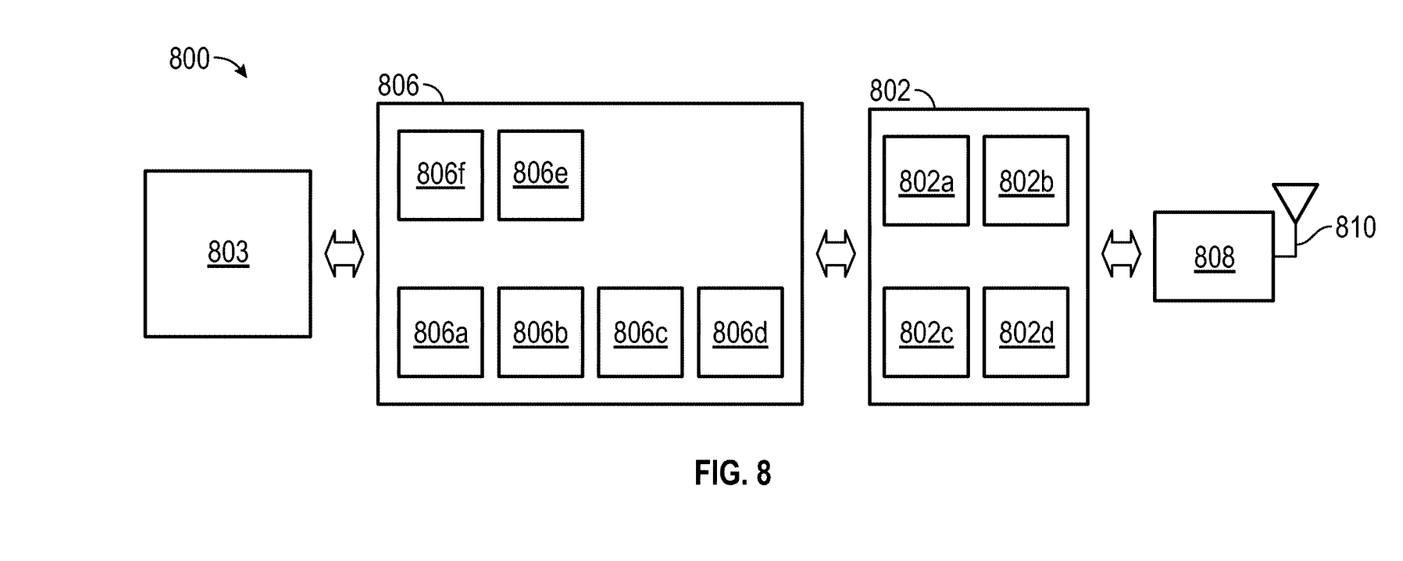
FIG. 8 illustrates example components of a UE device in accordance with some embodiments.

Embodiments described herein may be implemented into a system using any suitably configured hardware and/or software. FIG. 8 illustrates, for one embodiment, example components of a User Equipment (UE) device 800. In some embodiments, the UE device 800 may include application circuitry 803, baseband circuitry 806, Radio Frequency (RF) circuitry 802, front-end module (FEM) circuitry 808 and one or more antennas 801, coupled together at least as shown.

The application circuitry 803 may include one or more application processors. For example, the application circuitry 803 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 806 may include circuitry such as, but not limited to, one or more single-core or multi-core processors. The baseband circuitry 806 may include one or more baseband processors and/or control logic to process baseband signals received from a receive signal path of the RF circuitry 802 and to generate baseband signals for a transmit signal path of the RF circuitry 802. Baseband processing circuitry 806 may interface with the application circuitry 803 for generation and processing of the baseband signals and for controlling operations of the RF circuitry 802. For example, in some embodiments, the baseband circuitry 806 may include a second generation (2G) baseband processor 806a, third generation (3G) baseband processor 806b, fourth generation (4G) baseband processor 806c, and/or other baseband processor(s) 806d for other existing generations, generations in development or to be developed in the future (e.g., fifth generation (5G), 6G, etc.). The baseband circuitry 806 (e.g., one or more of baseband processors 806a-d) may handle various radio control functions that enable communication with one or more radio networks via the RF circuitry 802. The radio control functions may include, but are not limited to, signal modulation/demodulation, encoding/decoding, radio frequency shifting, etc. In some embodiments, modulation/demodulation circuitry of the baseband circuitry 806 may include Fast-Fourier Transform (FFT), preceding, and/or constellation mapping/demapping functionality. In some embodiments, encoding/decoding circuitry of the baseband circuitry 806 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 806 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP) and/or radio resource control (RRC) elements. A central processing unit (CPU) 806e of the baseband circuitry 806 may be configured to run elements of the protocol stack for signaling of the PHY, MAC, RLC, PDCP and/or RRC layers. In some embodiments, the baseband circuitry may include one or more audio digital signal processor(s) (DSP) 806f. The audio DSP(s) 806f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 806 and the application circuitry 803 may be implemented together such as, for example, on a system on a chip (SOC).

In some embodiments, the baseband circuitry 806 may provide for communication compatible with one or more radio technologies. For example, in some embodiments, the baseband circuitry 806 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 806 is configured to support radio communications of more than one wireless protocol may be referred to as multi-mode baseband circuitry.

RF circuitry 802 may enable communication with wireless networks using modulated electromagnetic radiation through a non-solid medium. In various embodiments, the RF circuitry 802 may include switches, filters, amplifiers, etc. to facilitate the communication with the wireless network. RF circuitry 802 may include a receive signal path which may include circuitry to down-convert RF signals received from the FEM circuitry 808 and provide baseband signals to the baseband circuitry 806. RF circuitry 802 may also include a transmit signal path which may include circuitry to up-convert baseband signals provided by the baseband circuitry 806 and provide RF output signals to the FEM circuitry 808 for transmission.

In some embodiments, the RF circuitry 802 may include a receive signal path and a transmit signal path. The receive signal path of the RF circuitry 802 may include mixer circuitry 802a, amplifier circuitry 802b and filter circuitry 802c. The transmit signal path of the RF circuitry 802 may include filter circuitry 802c and mixer circuitry 802a. RF circuitry 802 may also include synthesizer circuitry 802d for synthesizing a frequency for use by the mixer circuitry 802a of the receive signal path and the transmit signal path. In some embodiments, the mixer circuitry 802a of the receive signal path may be configured to down-convert RF signals received from the FEM circuitry 808 based on the synthesized frequency provided by synthesizer circuitry 802d. The amplifier circuitry 802b may be configured to amplify the down-converted signals and the filter circuitry 802c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 802a of the receive signal path may comprise passive mixers, although the scope of the embodiments is not limited in this respect.

In some embodiments, the mixer circuitry 802a of the transmit signal path may be configured to up-convert input baseband signals based on the synthesized frequency provided by the synthesizer circuitry 802d to generate RF output signals for the FEM circuitry 808. The baseband signals may be provided by the baseband circuitry 806 and may be filtered by filter circuitry 802c. The filter circuitry 802c may include a low-pass filter (LPF), although the scope of the embodiments is not limited in this respect.

In some embodiments, the mixer circuitry 802a of the receive signal path and the mixer circuitry 802a of the transmit signal path may include two or more mixers and may be arranged for quadrature downconversion and/or upconversion respectively. In some embodiments, the mixer circuitry 802a of the receive signal path and the mixer circuitry 802a of the transmit signal path may include two or more mixers and may be arranged for image rejection (e.g., Hartley image rejection). In some embodiments, the mixer circuitry 802a of the receive signal path and the mixer circuitry 802a may be arranged for direct downconversion and/or direct upconversion, respectively. In some embodiments, the mixer circuitry 802a of the receive signal path and the mixer circuitry 802a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 802 may include analog-to-digital converter (ADC) and digital-to-analog converter (DAC) circuitry and the baseband circuitry 806 may include a digital baseband interface to communicate with the RF circuitry 802.

In some dual-mode embodiments, a separate radio IC circuitry may be provided for processing signals for each spectrum, although the scope of the embodiments is not limited in this respect.

In some embodiments, the synthesizer circuitry 802d may be a fractional-N synthesizer or a fractional N/N+1 synthesizer, although the scope of the embodiments is not limited in this respect as other types of frequency synthesizers may be suitable. For example, synthesizer circuitry 802d may be a delta-sigma synthesizer, a frequency multiplier, or a synthesizer comprising a phase-locked loop with a frequency divider.

The synthesizer circuitry 802d may be configured to synthesize an output frequency for use by the mixer circuitry 802a of the RF circuitry 802 based on a frequency input and a divider control input. In some embodiments, the synthesizer circuitry 802d may be a fractional N/N+1 synthesizer.

In some embodiments, frequency input may be provided by a voltage controlled oscillator (VCO), although that is not a requirement. Divider control input may be provided by either the baseband circuitry 806 or the applications processor 803 depending on the desired output frequency. In some embodiments, a divider control input (e.g., N) may be determined from a look-up table based on a channel indicated by the applications processor 803.

Synthesizer circuitry 802d of the RF circuitry 802 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 802d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 802 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 802 for further processing. FEM circuitry 808 may also include a transmit signal path which may include circuitry configured to amplify signals for transmission provided by the RF circuitry 802 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 802). The transmit signal path of the FEM circuitry 808 may include a power amplifier (PA) to amplify input RF signals (e.g., provided by RF circuitry 802), and one or more filters to generate RF signals for subsequent transmission (e.g., by one or more of the one or more antennas 810.

In some embodiments, the UE device 800 may include additional elements such as, for example, memory/storage, display, camera, sensor, and/or input/output (I/O) interface.

The several embodiments described herein provide for UE power savings using intra-subframe dynamic reception diversity. The intra-subframe dynamic reception diversity may be combined with inter-subframe dynamic reception diversity and other power savings techniques to reduce power consumption even further.

ADDITIONAL DESCRIPTION AND EXAMPLES

Example 1 includes subject matter (such as an apparatus of user equipment (UE)) comprising physical layer (PHY) circuitry, wherein the PHY circuitry includes a radio frequency (RF) transceiver comprising: a first receive path configured to receive RF signals from an enhanced node B (eNB) of a cellular network and down convert the received RF signals using a local oscillator (LO) receive frequency; and a second receive path configured to down-convert received RF signals from the eNB and to operate simultaneously with the first communication path; and processing circuitry configured to: determine that a configured transmission mode of the UE supports receiving data using a single receive channel and includes receive antenna diversity; determine channel conditions using at least one channel quality metric; and disable one of the first and second receive paths during a portion of a subframe transmitted during a downlink (DL) communication according to the determined transmission mode and the determined channel conditions.

In Example 2, the subject matter of Example 1 optionally includes processing circuitry configured to disable one of the first and second receive paths when the configured transmission mode is a transmission scheme that includes at least one of i) open loop spatial multiplexing with cyclic delay diversity (CDD), ii) closed loop spatial multiplexing iii) multi-user multiple-input multiple-output (MIMO) multiplexing, iv) dual-layer transmission capability, or v) eight-layer transmission capability.

In Example 3, the subject matter of one or both of Examples 1 and 2 optionally includes RF transceiver circuitry configured to: measure a signal to interference plus noise ratio (SINR), and wherein the power management circuitry is configured to determine channel conditions using the measured SINR and disable the at least one receive path when the measured SINR exceeds a specified threshold SINR value.

In Example 4, the subject matter of one or any combination of Examples 1-3 optionally includes processing circuitry configured to monitor a channel to generate a history of channel quality of the channel, and wherein disabling the at least one receive path includes disabling the at least one receive path according to the history of channel quality.

In Example 5, the subject matter of one or any combination of Examples 1-4 optionally includes processing circuitry configured to enable the at least one receive path of the UE during a first control portion of consecutive subframes of the DL communication, and disabling the at least one receive path of the UE during a second data portion of the consecutive subframes of the DL communication.

In Example 6, the subject matter of one or any combination of Examples 1-5 optionally includes processing circuitry configured to determine a physical downlink control channel (PDCCH) decoding mode using the determined channel conditions, and disable the at least one receive path of the UE during a portion of the subframe according to the determined transmission mode, the PDCCH decoding mode, and the determined channel conditions.

In Example 7, the subject matter of one or any combination of Examples 1-6 optionally includes a plurality of antennas electrically coupled to the transceiver circuitry, wherein the processing circuitry is configured to determine a transmission scheme of the UE using downlink control information (DCI) received using PDCCH decoding after the start of the PDSCH region within the subframe.

In Example 8, the subject matter of one or any combination of Examples 1-7 optionally processing circuitry configured to disable one or more of a local oscillator circuit, an analog to digital converter circuit, an amplifier circuit, and a physical layer base band for a diversity receive path during transmission of the portion of the subframe.

In Example 9, the subject matter of one or any combination of Examples 1-8 optionally includes processing circuitry configured to identify a receive path of a plurality of receive paths with lower channel quality using the at least one channel quality metric, and disable receive path with lower channel quality during the portion of the subframe.

In Example 10, the subject matter of one or any combination of Examples 1-9 optionally includes processing circuitry configured to identify that the configured transmission mode includes a multiple-user multiple-input multiple-output (MU-MIMO) transmission scheme, and to disable the receive path when only one user is scheduled for the receive path.

In Example 11, the subject matter of one or any combination of Examples 1-10 optionally includes processing circuitry configured to determine that the configured transmission mode of the UE supports receiving data using a single receive channel when the configured transmission mode is a transmission mode of a 3rd Generation Partnership Project (3GPP) Evolved Universal Terrestrial Radio Access Network (E-UTRAN) Long-Term-Evolution (LTE) network.

In Example 12, the subject matter of one or any combination of Examples 1-11 optionally includes RF transceiver circuitry that includes N receive paths configured to down-convert RF signals received from the STA, wherein N is an integer greater than two, and wherein the power management circuitry is configured to disable any combination of the N receive paths according to the determined transmission mode and the determined channel conditions.

Example 13 includes subject matter (such as a method, a means for performing acts, or a computer readable storage medium including instructions that, when executed by baseband processing circuitry of user equipment (UE) of a cellular communication network, cause the UE to perform acts), or can optionally be combined with the subject matter of one or any combination of Examples 1-12 to include such subject matter, comprising determining that a configured transmission mode of the UE supports receiving data using a single receive channel and includes receive antenna diversity; determining channel conditions using at least one channel quality metric; and disabling the at least one receive path of the UE during a second data portion of the consecutive subframes of the DL communication according to the determined transmission mode and the determined channel conditions.

In Example 14, the subject matter of Example 13 optionally includes determining a physical downlink control channel (PDCCH) decoding mode using the determined channel conditions, and wherein the disabling at least one receive path includes disabling the at least one receive path of the UE during a portion of the subframe according to the determined transmission mode, the PDCCH decoding mode, and the determined channel conditions.

In Example 15, the subject matter of one or both of Examples 13-14 optionally includes determining that the transmission mode is a transmission scheme that includes at least one of i) open loop spatial multiplexing with cyclic delay diversity (CDD), ii) closed loop spatial multiplexing iii) multi-user multiple-input multiple-output (MIMO) multiplexing, iv) dual-layer transmission capability, or v) eight-layer transmission capability.

In Example 16, the subject matter of one or any combination of Examples 13-15 optionally includes determining that the transmission mode is a transmission mode (TM) of a 3rd Generation Partnership Project (3GPP) Universal Terrestrial Radio Access Network (UTRAN) Long-Term-Evolution (LTE) network that includes receive antenna diversity.

In Example 17, the subject matter of one or any combination of Examples 13-16 optionally includes determining channel conditions using a measurement of signal to interference plus noise ratio (SINR) and wherein disabling the at least one receive path includes disabling the at least one receive path when the measured SINR exceeds a specified threshold SINR value.

In Example 18, the subject matter of one or any combination of Examples 13-17 optionally includes monitoring a channel to generate a history of channel quality of the channel, and wherein disabling the at least one receive path includes disabling the at least one receive path according to the history of channel quality and the determined channel conditions.

In Example 19, the subject matter of one or any combination of Examples 13-18 optionally includes enabling the at least one receive path of the UE during a first control portion of consecutive subframes of the DL communication, and disabling the at least one receive path of the UE during a second data portion of the consecutive subframes of the DL communication.

In Example 20, the subject matter of one or any combination of Examples 13-19 optionally includes determining the transmission mode using downlink control information (DCI) received using PDCCH decoding after the UE enters radio resource control (RCC) connected mode.

In Example 21, the subject matter of one or any combination of Examples 13-20 optionally includes determining the transmission mode using downlink control information (DCI) received using PDCCH decoding after the start of the PDSCH region within the subframe.

In Example 22, the subject matter of one or any combination of Examples 13-21 optionally includes disabling the at least one receive path by disabling one or more of a local oscillator circuit, an analog to digital converter circuit, an amplifier circuit, and a physical layer base band for a diversity receive path.

In Example 23, the subject matter of one or any combination of Examples 13-22 optionally includes disabling, according to the determined transmission mode and the determined channel conditions, a receive path of a plurality of receive paths with lower channel quality determined using the at least one channel quality metric.

In Example 24, the subject matter of one or any combination of Examples 13-23 optionally includes determining that transmission mode is a multiple user multiple input multiple output (MU-MIMO) transmission mode, and disabling the receive path when one only one user is scheduled for the receive path.

These non-limiting Examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. An apparatus of user equipment (UE), the apparatus comprising:
    physical layer (PHY) circuitry configured to receive a radio frequency (RF) downlink (DL) communication, wherein the DL communication includes a number of frames, a frame includes multiple subframes, and a subframe includes a first intra-subframe portion and a second intra-subframe portion, and wherein the PHY circuitry includes a radio frequency (RF) transceiver comprising:
    a first receive path configured to receive RF signals from an enhanced node B (eNB) of a cellular network and down convert the received RF signals using a local oscillator (LO) receive frequency; and
    a second receive path configured to down-convert received RF signals from the eNB and to operate simultaneously with the first communication path; and
    processing circuitry configured to:
    determine that a configured transmission mode of the UE supports receiving data using a single receive channel and includes receive antenna diversity, wherein the transmission mode is a transmission mode of one or both of a long term evolution network and a Wi-Fi network;
    determine that a configured physical downlink control channel (PDCCH) decoding mode of the UE provides PDCCH decoding earlier during a subframe, wherein the configured PDCCH decoding mode is determined using determined channel conditions; and
    disable one of the first and second receive paths during the first intra-subframe portion of multiple subframes of a frame of the DL communication according to the determined transmission mode, the determined channel conditions and the PDCCH decoding mode, and enable the first and second receive paths during the second intra-subframe portion of the multiple subframes of the frame.

2. The apparatus of claim 1, wherein the processing circuitry is configured to disable one of the first and second receive paths when the configured transmission mode is a transmission scheme that includes at least one of i) open loop spatial multiplexing with cyclic delay diversity (CDD), ii) closed loop spatial multiplexing iii) multi-user multiple-input multiple-output (MIMO) multiplexing, iv) dual-layer transmission capability, or v) eight-layer transmission capability.

3. The apparatus of claim 1, wherein the RF transceiver circuitry is configured to: measure a signal to interference plus noise ratio (SINR), and wherein the processing circuitry is configured to determine channel conditions using the measured SINR and disable the at least one receive path when the measured SINR exceeds a specified threshold SINR value and disable one of the first and second receive paths using the determined channel conditions.

4. The apparatus of claim 1, wherein the processing circuitry is configured to monitor a channel to generate a history of channel quality of the channel, and wherein disabling the at least one receive path includes disabling the at least one receive path according to the history of channel quality.

5. The apparatus of claim 1, wherein the processing circuitry is configured to enable the at least one receive path of the UE during a first control portion of consecutive subframes of the DL communication, and disable the at least one receive path of the UE during a second data portion of the consecutive subframes of the DL communication.

6. The apparatus of claim 1, including a plurality of antennas electrically coupled to the transceiver circuitry, wherein the processing circuitry is configured to determine a transmission scheme of the UE using downlink control information (DCI) received using the PDCCH decoding after the start of the PDSCH region within the subframe.

7. The apparatus of claim 1, wherein the processing circuitry is configured to disable one or more of a local oscillator circuit, an analog to digital converter circuit, an amplifier circuit, and a physical layer base band for a diversity receive path during transmission of the portion of the subframe.

8. The apparatus of claim 1, wherein the processing circuitry is configured to identify a receive path of a plurality of receive paths with lower channel quality using the at least one channel quality metric, and disable receive path with lower channel quality during the portion of the subframe.

9. The apparatus of claim 1, wherein the processing circuitry is configured to identify that the configured transmission mode includes a multiple-user multiple-input multiple-output (MU-MIMO) transmission scheme, and to disable the receive path when only one user is scheduled for the receive path.

10. The apparatus of claim 1, wherein the processing circuitry is configured to determine that the configured transmission mode of the UE supports receiving data using a single receive channel when the configured transmission mode is a transmission mode of a 3rd Generation Partnership Project (3GPP) Evolved Universal Terrestrial Radio Access Network (E-UTRAN) Long-Term-Evolution (LTE) network.

11. The apparatus of claim 1, wherein the RF transceiver circuitry includes N receive paths configured to downconvert RF signals received from the STA, wherein N is an integer greater than two, and wherein the processing circuitry is configured to disable any combination of the N receive paths according to the determined transmission mode and the PDCCH decoding mode.

12. A method of operating user equipment (UE), the method comprising:
receiving a downlink (DL) communication, wherein a DL communication includes a number of frames, a frame includes multiple subframes, and a subframe includes a first intra-subframe portion and a second intra-subframe portion;
determining that a configured transmission mode of the UE supports receiving data using a single receive channel and includes receive antenna diversity, wherein the transmission mode is a transmission mode of one or both of a long term evolution network and a Wi-Fi network;
determining that a configured physical downlink control channel (PDCCH) decoding mode of the UE provides PDCCH decoding earlier during a subframe, wherein the configured PDCCH decoding mode is determined using determined channel conditions; and
disabling at least one receive path of the UE during the first intra-subframe portion of multiple subframes of a frame of the DL communication according to the determined transmission mode, the determined channel conditions and the PDCCH decoding mode, and enabling the at least one receive path during the second intra-subframe portion of the multiple subframes of the frame.

13. The method of claim 12, wherein determining that a configured transmission mode of the UE supports receiving data using a single receive channel includes determining that the transmission mode is a transmission scheme that includes at least one of i) open loop spatial multiplexing with cyclic delay diversity (CDD), ii) closed loop spatial multiplexing iii) multi-user multiple-input multiple-output (MIMO) multiplexing, iv) dual-layer transmission capability, or v) eight-layer transmission capability.

14. The method of claim 12, wherein determining that a configured transmission mode of the UE supports receiving data using a single receive channel includes determining that the transmission mode is a transmission mode (TM) of a 3rd Generation Partnership Project (3GPP) Universal Terrestrial Radio Access Network (UTRAN) Long-Term-Evolution (LTE) network that includes receive antenna diversity.

15. The method of claim 12, including determining channel conditions using a measurement of signal to interference plus noise ratio (SINR) and wherein disabling the at least one receive path includes disabling the at least one receive path when the measured SINR exceeds a specified threshold SINR value.

16. The method of claim 12, including monitoring a channel to generate a history of channel quality of the channel, and wherein disabling the at least one receive path includes disabling the at least one receive path according to the history of channel quality and the determined channel conditions.

17. The method of claim 12, including enabling the at least one receive path of the UE during a first control portion of consecutive subframes of the DL communication, and disabling the at least one receive path of the UE during a second data portion of the consecutive subframes of the DL communication.

18. The method of claim 12, wherein determining that a configured transmission mode of the UE supports receiving data using a single receive channel includes determining the transmission mode using downlink control information (DCI) received using the PDCCH decoding after the UE enters radio resource control (RCC) connected mode.

19. The method of claim 12, wherein determining that a configured transmission mode of the UE supports receiving data using a single receive channel includes determining the transmission mode using downlink control information (DCI) received using the PDCCH decoding after the start of the PDSCH region within the subframe.

20. A non-transitory computer readable storage medium including instructions that, when executed by baseband processing circuitry of user equipment (UE) of a cellular communication network, cause the UE to:
   receive a downlink (DL) communication, wherein a DL communication includes a number of frames, a frame includes multiple subframes, and a subframe includes a first intra-subframe control portion and a second intra-subframe data portion;
   determine that a configured transmission mode of the UE supports receiving data using a single receive channel and includes receive antenna diversity, wherein the transmission mode is a transmission mode of one or both of a long term evolution network and a Wi-Fi network;
   determine that a configured physical downlink control channel (PDCCH) decoding mode of the UE provides PDCCH decoding earlier during a subframe, wherein the configured PDCCH decoding mode is determined using determined channel conditions; and
   enable at least one receive path of the UE during the first intra-subframe control portion of each of consecutive subframes of a frame of the DL communication, and disable the at least one receive path of the UE during the second intra-subframe data portion of each of the consecutive subframes of the frame according to the determined transmission mode, the determined channel conditions and the PDCCH decoding mode.

21. The computer readable storage medium of claim 20, including instructions that, when executed by the baseband processing circuitry of the UE cause the UE to determine that the configured transmission mode of the UE supports receiving data using a single receive channel when the configured transmission mode is a transmission mode of a 3rd Generation Partnership Project (3GPP) Evolved Universal Terrestrial Radio Access Network (E-UTRAN) Long-Term-Evolution (LTE) network that includes receive antenna diversity.

22. The computer readable storage medium of claim 20, including instructions that, when executed by the baseband processing circuitry of the UE cause the UE to determine channel conditions using a measurement of signal to interference plus noise ratio (SINR), and wherein disabling the at least one receive path includes disabling the at least one receive path when the measured SINR exceeds a specified threshold SINR value.

* * * * *

UNITED STATES PATENT AND TRADEMARK OFFICE
CERTIFICATE OF CORRECTION

PATENT NO. : 10,244,519 B2
APPLICATION NO. : 14/977010
DATED : March 26, 2019
INVENTOR(S) : Cesares Cano et al.

Page 1 of 1

It is certified that error appears in the above-identified patent and that said Letters Patent is hereby corrected as shown below:

On the Title Page

Item (57), in "Abstract", in Column 2, Line 14, delete "and;" and insert --and-- therefor In the Claims In Column 20, Line 6, in Claim 21, before "computer readable", insert --non-transitory--

In Column 20, Line 16, in Claim 22, before "computer readable", insert --non-transitory--

Signed and Sealed this
Twelfth Day of May, 2020

Andrei Iancu
*Director of the United States Patent and Trademark Office*